(12) United States Patent
Noguchi et al.

(10) Patent No.: US 8,878,439 B2
(45) Date of Patent: Nov. 4, 2014

(54) LIGHTING CONTROL SYSTEM AND LIGHTING CONTROL METHOD

(71) Applicant: Toshiba Lighting & Technology Corporation, Kanagawa (JP)

(72) Inventors: Yoko Noguchi, Kanagawa (JP); Tomoko Ishiwata, Kanagawa (JP); Makoto Kawagoe, Kanagawa (JP); Takayuki Ono, Kanagawa (JP); Kenji Takahashi, Kanagawa (JP); Hidenori Nishigaki, Kanagawa (JP); Junko Takahashi, Kanagawa (JP); Shigehisa Kawatsuru, Kanagawa (JP); Hitoshi Kawano, Kanagawa (JP); Fumie Iwata, Kanagawa (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 174 days.

(21) Appl. No.: 13/688,987

(22) Filed: Nov. 29, 2012

(65) Prior Publication Data

US 2014/0042911 A1 Feb. 13, 2014

(30) Foreign Application Priority Data

Aug. 7, 2012 (JP) ................... 2012-174904

(51) Int. Cl.
*H05B 37/02* (2006.01)
*H05B 39/04* (2006.01)
*G01J 1/00* (2006.01)

(52) U.S. Cl.
CPC ............ *H05B 37/02* (2013.01); *H05B 37/0227* (2013.01); *Y02B 20/44* (2013.01); *H05B 39/042* (2013.01); *G01J 1/00* (2013.01)
USPC ............................ 315/152; 315/294; 315/155

(58) Field of Classification Search
CPC ............ H05B 37/0218; H05B 37/0227; F21V 23/0464; F21V 23/0471
USPC .................................................. 315/152–158
See application file for complete search history.

(56) References Cited

U.S. PATENT DOCUMENTS

| | | | |
|---|---|---|---|
| 2010/0301767 A1* | 12/2010 | Van De Sluis et al. | 315/294 |
| 2012/0057755 A1* | 3/2012 | Berkvens | 382/103 |
| 2012/0206050 A1* | 8/2012 | Spero | 315/152 |
| 2013/0063046 A1* | 3/2013 | Pandharipande et al. | 315/297 |
| 2013/0069543 A1* | 3/2013 | Mohan et al. | 315/155 |
| 2013/0334973 A1* | 12/2013 | Wagenaar Cacciola | 315/152 |
| 2014/0159589 A1* | 6/2014 | Pandharipande et al. | 315/155 |

FOREIGN PATENT DOCUMENTS

JP 2011-165577 8/2011

\* cited by examiner

*Primary Examiner* — Don Le
(74) *Attorney, Agent, or Firm* — Tucker Ellis LLP

(57) ABSTRACT

According to one embodiment, a lighting control system includes a plurality of luminaire, a sensor device, a luminance sensor, and a lighting control unit. The luminaires are set in a lighting space. The sensor device detects presence of a person in the lighting space. The luminance sensor detects indirect luminance in a predetermined position in the lighting space by the luminaire. The lighting control unit subjects the luminaire to lighting control such that the indirect luminance detected by the luminance sensor does not fall below a predetermined value in a position where the sensor device detects presence of the person.

12 Claims, 3 Drawing Sheets

LIGHTING CONTROL SYSTEM AND LIGHTING CONTROL METHOD

INCORPORATION BY REFERENCE

The present invention claims priority under 35 U.S.C. §119 to Japanese Patent Application No. 2012-174904 filed on Aug. 7, 2012. The content of the application is incorporated herein by reference in their entirety.

FIELD

Embodiments described herein relate generally to a lighting control system including a plurality of luminaires set in a lighting space and a lighting control method.

BACKGROUND

In the past, in a facility such as an office and a store, a lighting control system that controls a plurality of luminaires set in a lighting space of the facility is used. In the lighting system, a communication function is installed in the luminaires. A lighting state of each of the luminaires can be individually controlled. Therefore, in the lighting control system, a lighting area and a dimming area can be set in a free layout using an area controller, which functions as a master set of the system, a luminance sensor, a human sensor, and the like.

DETAILED DESCRIPTION

In general, according to one embodiment, a lighting control system includes a plurality of luminaires, a presence detecting section, a luminance detecting section, and a control section. The luminaires are set in a lighting space. The presence detecting section detects presence of a person in the lighting space. The luminance detecting section detects indirect luminance in a predetermined position in the lighting space by the luminaire. The control section subjects the luminaire to lighting control such that the indirect luminance detected by the luminance detecting section does not fall below a predetermined value in a position where the presence detecting section detects presence of the person.

The configuration of a lighting control system according to the first embodiment is explained below with reference to FIGS. 1 to 3.

Figure 1:
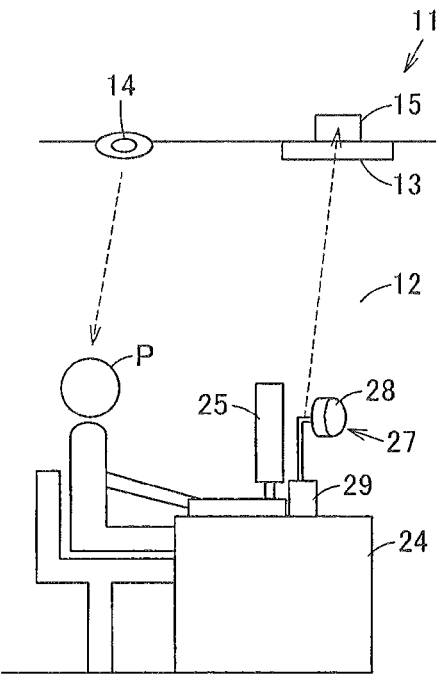
FIG. 1 is a schematic explanatory diagram of a part of a lighting control system according to a first embodiment.
Figure 2:
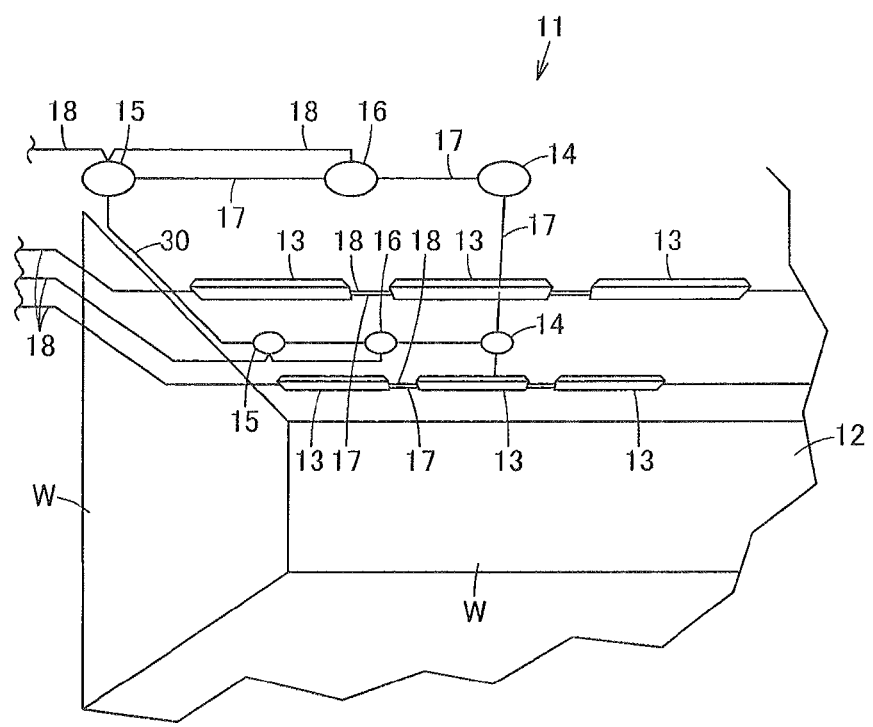
FIG. 2 is a schematic explanatory diagram of the lighting control system.
Figure 3:
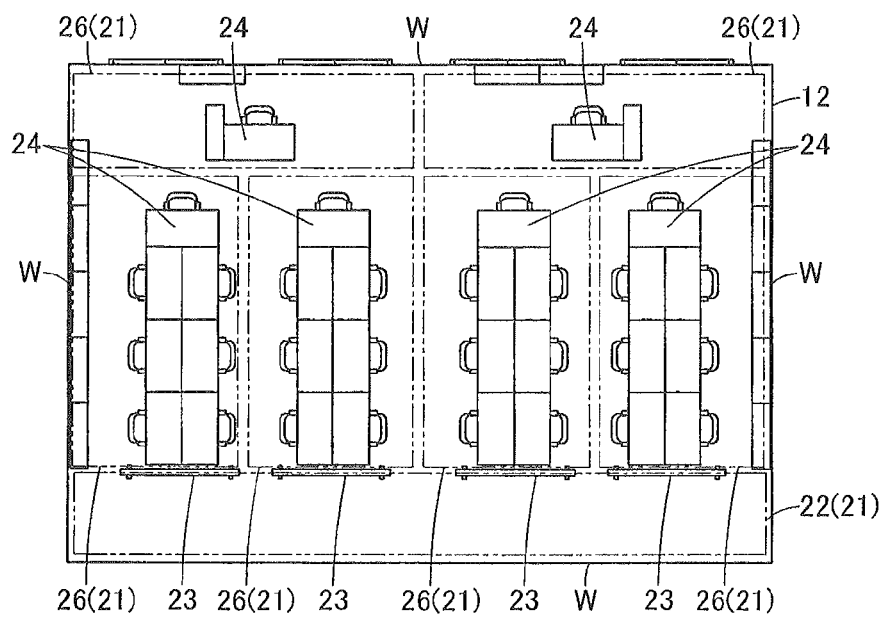
FIG. 3 is a schematic explanatory diagram of a lighting space lit by the lighting control system viewed from the ceiling side.

As shown in FIGS. 1 to 3, a lighting control system 11 centrally controls lighting states of a plurality of luminaires 13 set side by side in the entire area of the ceiling or the like of a lighting space 12 in a room of a facility such as an office or a store. A sensor device 14, which is a human sensor functioning as a presence detecting section, is set for each of the plurality of luminaires 13 in the lighting space 12. The lighting control system 11 includes a lighting control unit 15 functioning as a control section that subjects the luminaires 13 to lighting control and a communication unit 16 that supplies a control signal from the lighting control unit 15 to the luminaires 13. A plurality of the lighting control units 15, a plurality of the communication units 16, and a plurality of the sensor devices 14 are connected to one another via a signal line 17 to be capable of communicating with one another. Electric power is supplied to the luminaires 13, the sensor devices 14, the lighting control units 15, and the communication units 16 from a not-shown power supply section such as a distribution panel via power supply lines 18.

The shape of the lighting space 12, the arrangement of the luminaires 13, and the like can be arbitrarily set. However, in this embodiment, to make the explanation clearer, the lighting space 12 is formed in, for example, a square shape in plan view surrounded by walls W, the luminaires 13 are arranged in a matrix shape on the ceiling of the lighting space 12 along the longitudinal direction (the up-down direction in FIG. 3), which is a predetermined direction in plan view, of the lighting space 12 and the width direction (the left-right direction in FIG. 3), which is a crossing direction crossing the longitudinal direction, and a plurality of square lighting areas 21 are partitioned. The lighting area 21 having an elongated square shape extending along one wall W forms a passage space 22. The other plurality of lighting areas 21 partitioned by partitions 23 from the passage space 22 form work spaces (office spaces) 26 including desks 24 and personal computers (PCs) 25.

The luminaire 13 includes a luminaire main body, a dimmable light source such as a fluorescent lamp, a bulb, or an LED arranged in the luminaire main body, a lighting circuit that turns on, turns off, and dims the light source, a communication section that communicates with the lighting control unit 15 through the communication unit 16, and a lighting control section that controls the lighting circuit according to a control signal received through the communication section to control a lighting state of the light source. Lighting control sections of the luminaires 13 respectively have peculiar addresses. The lighting control sections have a function of specifying and receiving control signals to the own addresses transmitted from the lighting control units 15 and transmitting lighting control states of the lighting control sections to the lighting control units 15 together with the own addresses to enable the lighting control units 15 to specify the lighting control states. As the luminaires 13, luminaires all having the same luminous intensity distribution characteristic may be arranged. Alternatively, luminaires having arbitrary luminous intensity distribution characteristics, for example, luminaires having different luminous intensity distribution characteristics and different lighting directions can be selected and set in predetermined positions such as the vicinities of the walls W and other positions.

The sensor device 14 is an image sensor (an image recognition sensor) or the like that detects the presence of a person P in the lighting space 12 such as the lighting areas 21. The number and the positions of the sensor devices 14 to be set can be arbitrarily set according to the breadth (the size), the shape, the arrangement, and the like of the lighting areas 21 of the lighting space 12. If a plurality of the sensor devices 14 are arranged, peculiar addresses are respectively set for the sensor devices 14. The sensor devices 14 are configured to communicate with the lighting control units 15 via the signal line 17 using the addresses.

Indirect luminance in the position of the eyes of the person P, i.e., indirect luminance before eyes has a strong correlation with a feeling of brightness of the lighting space 12. Therefore, the indirect luminance before eyes can be used as an index quantitatively indicating the feeling of brightness of the lighting space 12. Therefore, indirect luminance in the position of the eyes of the person P sitting at the desk 24 is detected using a luminance sensor 27 functioning as a luminance detecting section arranged, for example, on the desk 24. The indirect luminance is set as a brightness feeling index.

The luminance sensor 27 includes a photographing unit such as a camera and an arithmetic operation unit 29 functioning as a base of the photographing unit 28. The photographing unit 28 projects upwardly from the upper surface of the desk 24 to the vicinity of the height position of the eyes of the sitting person P, for example, in the position of the back of the personal computer 25. The photographing unit 28 can acquire, as an image, brightness distribution of a predetermined view angle in the same direction as the direction of the sitting person P, for example, a view angle of 180°. The arithmetic operation unit 29 can detect indirect luminance (indirect luminance before eyes) in the position of the eyes of the person P on the basis of the brightness distribution acquired by the photographing unit 28 and transmit the indirect luminance to the lighting control unit 15 by wire or by radio.

Specifically, in this embodiment, the arithmetic operation unit 29 detects the indirect luminance (the indirect luminance before eyes) in the position of the eyes of the person P by measuring the indirect luminance before eyes. In this case, the arithmetic operation unit 29 measures the indirect luminance before eyes by excluding the luminaire 13 (a direct brightness value by the luminaire 13) from the brightness distribution of the lighting space 12 acquired by the photographing unit 28 and calculating luminance formed on a vertical surface in an acquisition position of the brightness distribution, i.e., a photographing position in the photographing unit 28 by a brightness value in a region excluding the luminaire 13.

The luminance sensor 27 may be arranged for each desk 24 or may be arranged for each plurality of the desks 24 or for each lighting area 21. In this case, it is possible to detect indirect luminance (indirect luminance before eyes) in the position of the eyes of the person P sitting at the desk 24 by using the luminance sensor 27 located closest to the sitting person P detected by the sensor device 14. If a plurality of the luminance sensors 27 are arranged, peculiar addresses are respectively set for the luminance sensors 27. The luminance sensors 27 communicate with the lighting control units 15 using the addresses.

The lighting control units 15 are connected to one another via a signal line 30. For example, any one of the lighting control units 15 functions as a master set, i.e., an area controller in the lighting space 12. The other remaining lighting control units 15 function as slave sets, i.e., sub-controllers. The lighting control units 15 are configured to respectively have peculiar addresses and communicate with one another using the addresses.

Further, human detection information including position information of the person P from the sensor device 14 and detection information of indirect luminance before eyes from the luminance sensor 27 are input to the lighting control unit 15. The lighting control unit 15 has a function of, if the presence of the person P is detected, subjecting the luminaire 13 corresponding to the lighting area 21 included a position where the presence of the person P is detected to lighting control such that a brightness feeling index value (indirect luminance before eyes) does not fall below a predetermined value set in advance.

Specifically, as a method of increasing indirect luminance in the position of the eyes of the person P, which is a brightness feeling index value of the lighting area 21 of the lighting space 12, it is possible to use various illumination lighting patterns for, for example, turning on the luminaire 13 in the vicinity of the wall W to brighten the wall W (the wall surface), irradiating the ceiling surface with a light source arranged in the luminaire 13 to irradiate the ceiling surface, and changing an irradiation range of the luminaire 13 to increase the irradiation range. In lighting control for the luminaire 13 by the lighting control unit 15, for example, among a plurality of illumination lighting patterns set in advance, a most effective illumination lighting pattern is automatically selected by, for example, acquiring position information of the person P with the sensor device 14 according to the position of the person P (the distance between the person P and the wall W) and the arrangement of the luminaire 13 in the lighting space 12.

A lighting control method according to the first embodiment is explained.

First, the sensor device 14 detects whether the person P is present (the person P is sitting at the desk 24) in the lighting space 12.

When the sensor device 14 detects that the person P is sitting at the desk 24, the luminance sensor 27 detects indirect luminance (indirect luminance before eyes) in the position of the eyes of the person P in the lighting area 21 where the detected person P is present. At this point, the luminance sensor 27 uses the sensor device 14 in a position closest to the position of the detected person P by referring to (via the lighting control unit 15), for example, an address of the sensor device 14 that detects that the person P is present.

The lighting control unit 15 subjects the luminaire 13 to lighting control such that the indirect luminance (the indirect luminance before eyes) detected by the luminance sensor 27 does not fall below a predetermined value. For example, if the sensor device 14 detects that the person P is present in any one of the lighting areas 21 forming the work spaces 26, the lighting control unit 15 subjects the luminaire to the lighting control such that indirect luminance (indirect luminance before eyes) detected by the luminance sensor 27 does not fall below the predetermined value, for example, 60 [1x] (the indirect luminance is equal to or higher than 60 [1xx]). If the sensor device 14 detects that the person P is present in the lighting area 21 forming the passage space 22, the lighting control unit 15 subjects the luminaire 13 to the lighting control such that indirect luminance (indirect luminance before eyes) detected by the luminance sensor 27 does not fall below a predetermined value smaller than the predetermined value in the lighting area 21 forming the work space 26 (the indirect luminance is equal to or higher than 30 [1x]).

The lighting control for the luminaire 13 by the lighting control unit 15 is lighting control for preventing indirect luminance (indirect luminance before eyes) of the lighting area 21 where the person P is present (sitting at the desk 24) from falling below the predetermined value. Therefore, it is desirable to not only perform the lighting control for the luminaire 13 located in the lighting area 21 where the person P is present (sitting at the desk 24) but also perform the lighting control for the luminaires 13 located in the other lighting areas 21 as appropriate.

If the sensor device 14 detects that people P are present in a plurality of lighting areas 21, the lighting control units 15 subject the luminaires 13 to the lighting control such that indirect luminance (indirect luminance before eyes) of each of the lighting areas 21 does not fall below the predetermined value.

As explained above, in the first embodiment, the luminance sensor 27 measures indirect luminance by acquiring, with the photographing unit 28, brightness distribution of the lighting space 12, excluding the luminaire 13 from the acquired brightness distribution, and calculating, with the arithmetic operation unit 29, luminance formed on a vertical surface in an acquisition position of the brightness distribution by a brightness value of a region excluding the luminaire 13. Therefore, since indirect luminance (indirect luminance before eyes) in the position of the eyes of the person P can be more accurately acquired, it is possible to more surely subject the luminaire 13 to the lighting control such that indirect luminance (indirect luminance before eyes) of the lighting area 21 where the person P is present (sitting at the desk 24) does not fall below the predetermined value.

The photographing unit 28 is set to face a direction along the same direction as a line of sight direction of the sitting person P. Therefore, it is possible to more surely obtain brightness distribution of a range close to a visual field range of the person P.

Figure 4:
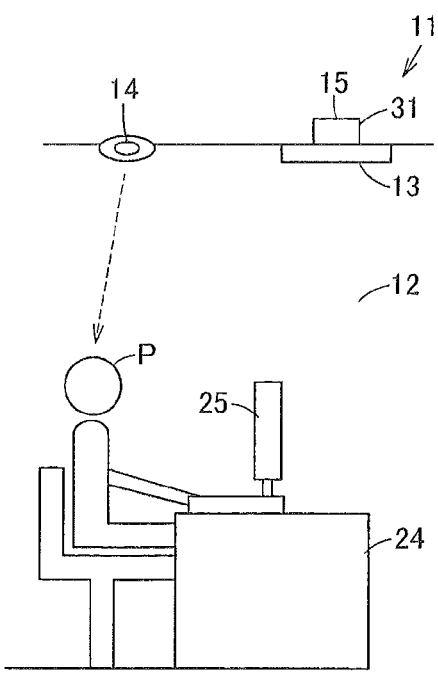
FIG. 4 is a schematic explanatory diagram of a part of a lighting control system according to a second embodiment.

In the first embodiment, for example, as in a second embodiment shown in FIG. 4, even if a luminance sensor 31 functioning as a luminance detecting section that detects indirect luminance (indirect luminance before eyes) in the position of the eyes of the person P by referring to data calculated in advance is used instead of the luminance sensor 27, the same action and effects can be attained. In this case, for example, the luminance sensor 31 is integrally incorporated in the lighting control unit 15. Data (table data) calculated in advance on the basis of the size of the lighting space 12, the reflectance of an interior surface of the lighting space 12, luminous intensity distribution data of the luminaire 13, the number of the luminaires 13, the position of the luminaire 13 turned on by the lighting control unit 15, and the like set in advance is stored. Indirect luminance (indirect luminance before eyes) is detected by referring to, from the stored data, data of a position closest to a position where the presence of the person P is detected by the sensor device 14. By adopting such a configuration, it is unnecessary to provide complicated components such as a photographing unit and an arithmetic operation unit and perform complicated calculation. It is possible to further simplify the configuration of the luminance sensor 31 that detects indirect luminance (indirect luminance before eyes) in the position of the eyes of the person P and increase the speed of processing. The luminance sensor 31 may be incorporated in the sensor device 14 or may be provided separately from the lighting control unit 15 and the sensor device 14.

Figure 5:
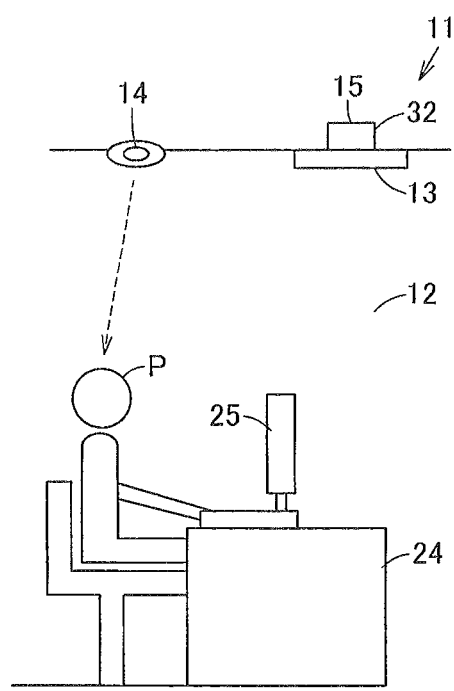
FIG. 5 is a schematic explanatory diagram of a part of a lighting control system according to a third embodiment.

In the first embodiment, for example, as in a third embodiment shown in FIG. 5, even if a luminance sensor 32 functioning as a luminance detecting section that calculates indirect luminance (indirect luminance before eyes) in the position of the eyes of the person P is used instead of the luminance sensor 27, the same action and effects can be attained. In this case, for example, the luminance sensor 32 is integrally incorporated in the lighting control unit 15. The size of the lighting space 12, the reflectance of an interior surface of the lighting space 12, luminous intensity distribution data of the luminaire 13, the number of the luminaires 13, the position of the luminaire 13 turned on by the lighting control unit 15, and the like set in advance are stored in advance. Indirect luminance (indirect luminance before eyes) is detected by calculating, on the basis of the stored data, with respect to a position where the presence of the person P is detected by the sensor device 14, the indirect luminance (the indirect luminance before eyes) every time the presence of the person P is detected. By adopting such a configuration, it is unnecessary to provide a complicated component such as a photographing unit. It is possible to further simplify the configuration of the luminance sensor 32 that detects indirect luminance (indirect luminance before eyes) in the position of the eyes of the person P. The luminance sensor 32 may be incorporated in the sensor device 14 or may be provided separately from the lighting control unit 15 and the sensor device 14.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A lighting control system comprising:
   a plurality of luminaires set in a lighting space;
   a presence detecting unit configured to detect presence of a person in the lighting space;
   a luminance detecting unit configured to detect indirect luminance in a predetermined position in the lighting space; and
   a control unit configured to subject the luminaires to lighting control such that the indirect luminance detected by the luminance detecting unit at a position where the presence detecting unit detects the presence of the person, does not fall below a predetermined value.

2. The system according to claim 1, wherein the luminance detecting unit detects the indirect luminance at the position where the presence detecting unit detects the presence of the person by referring to data calculated in advance on the basis of size of the lighting space, including reflectance of an interior surface of the lighting space, luminous intensity distribution data of the luminaires, a number of the luminaires, and position of the luminaires turned on by the control unit.

3. The system according to claim 1, wherein the luminance detecting unit detects the indirect luminance at the position where the presence detecting unit detects the presence of the person by calculating, on the basis of size of the lighting space, reflectance of an interior surface of the lighting space, luminous intensity distribution data of the luminaires, a number of the luminaires, and position of the luminaires turned on by the control unit, the indirect luminance with respect to the position where the presence detecting unit detects the presence of the person.

4. The system according to claim 1, wherein the luminance detecting unit measures the indirect luminance by acquiring brightness distribution of the lighting space, excluding brightness from the luminaires from the acquired brightness distribution, and calculating luminance formed on a vertical surface in an acquisition position of the brightness distribution.

5. The system according to claim 4, wherein the luminance detecting unit includes a photographing unit that is aligned to face the same direction as the person and configured to acquire the brightness distribution of the lighting space.

6. A lighting control method comprising:
   detecting that a person is present in a lighting space in which a plurality of luminaires are set; and
   detecting indirect luminance at a position where the presence of the person is detected, and subjecting the luminaires to lighting control such that the indirect luminance does not fall below a predetermined value.

7. The method according to claim 6, further comprising detecting the indirect luminance by referring to data calculated in advance on the basis of size of the lighting space, including reflectance of an interior surface of the lighting space, luminous intensity distribution data of the luminaires, a number of the luminaires, and position of the luminaires turned on by the control unit.

8. The method according to claim 6, further comprising detecting the indirect luminance by calculating, on the basis of size of the lighting space, reflectance of an interior surface of the lighting space, luminous intensity distribution data of the luminaires, a number of the luminaires, and position of the luminaires turned on by the control unit.

9. The method according to claim 6, further comprising measuring the indirect luminance by acquiring brightness distribution of the lighting space, excluding brightness from the luminaires from the acquired brightness distribution, and calculating luminance formed on a vertical surface in an acquisition position of the brightness distribution.

10. The method according to claim 9, further comprising acquiring brightness distribution in the same direction as a line of sight direction of the person.

11. A lighting control system comprising:
a plurality of luminaires set in a lighting space;
a plurality of presence detecting units each configured to detect presence of a person in a different position within the lighting space;
a luminance detecting unit in each of the different positions within the light space configured to detect indirect luminance thereat; and
a control unit configured to subject the luminaires to lighting control such that the indirect luminance detected by the luminance detecting unit at a position where the presence detecting unit detects the presence of the person, does not fall below a predetermined value.

12. The system according to claim 11, wherein:
if the presence detecting unit detects that the person if within a work space, the predetermined value is a first predetermined value, and
if the presence detecting unit detects that the person if within a passage space, the predetermined value is a second predetermined value that is smaller than the first predetermined value.

* * * * *